United States Patent
Baca et al.

(10) Patent No.: US 6,745,235 B2
(45) Date of Patent: Jun. 1, 2004

(54) INTELLIGENT NETWORK PROVIDING NETWORK ACCESS SERVICES (INP-NAS)

(75) Inventors: C. Daniel Baca, Parker, CO (US); David A. Pezzutti, Golden, CO (US)

(73) Assignee: Teleservices Solutions, Inc., Golden, CO (US)

( * ) Notice: Subject to any disclaimer, the term of this patent is extended or adjusted under 35 U.S.C. 154(b) by 307 days.

(21) Appl. No.: 09/905,773

(22) Filed: Jul. 13, 2001

(65) Prior Publication Data

US 2002/0029268 A1 Mar. 7, 2002

Related U.S. Application Data

(60) Provisional application No. 60/218,596, filed on Jul. 17, 2000.

(51) Int. Cl.⁷ .............................................. G06F 15/16
(52) U.S. Cl. ...................... 709/217; 709/219; 709/220; 709/223; 709/224
(58) Field of Search ................................ 709/223, 224, 709/220, 217, 219

(56) References Cited

U.S. PATENT DOCUMENTS

| | | | |
|---|---|---|---|
| 5,444,693 A | 8/1995 | Arslan et al. | 370/221 |
| 5,726,979 A | 3/1998 | Henderson et al. | 370/254 |
| 5,737,319 A | 4/1998 | Croslin et al. | 370/255 |
| 5,812,533 A | 9/1998 | Cox et al. | 370/259 |
| 5,901,284 A | 5/1999 | Hamdy-Swink | 713/200 |
| 5,910,984 A | 6/1999 | Low | 379/279 |
| 5,953,389 A | 9/1999 | Pruett et al. | 379/9 |
| 5,970,120 A | 10/1999 | Kasrai | 379/9 |
| 6,058,103 A | 5/2000 | Henderson et al. | 370/254 |
| 6,088,328 A | 7/2000 | McKnight | 370/216 |
| 6,088,587 A | 7/2000 | Abbadessa | 455/424 |
| 6,147,975 A * | 11/2000 | Bowman-Amuah | 370/252 |
| 6,178,438 B1 | 1/2001 | Tschirhart et al. | 709/200 |
| 6,181,695 B1 | 1/2001 | Curry et al. | 370/356 |
| 6,185,519 B1 | 2/2001 | Lin et al. | 703/21 |
| 6,188,757 B1 | 2/2001 | Malik | 379/207 |
| 6,208,642 B1 | 3/2001 | Balachandran et al. | 370/385 |
| 6,215,867 B1 | 4/2001 | Eslambolchi | 379/229 |
| 6,226,273 B1 | 5/2001 | Busuioc et al. | 370/270 |
| 6,229,819 B1 | 5/2001 | Darland et al. | 370/467 |
| 6,606,744 B1 * | 8/2003 | Mikurak | 717/174 |

* cited by examiner

*Primary Examiner*—Frantz B. Jean
(74) *Attorney, Agent, or Firm*—Lynn G. Foster

(57) ABSTRACT

An Intelligent Network Providing Network Access Services (INP-NAS) for telephonic services is disclosed, which utilizes a network platform containing applications controller and Object and Network Discovery techniques to activate applications providing a class of useful network services that reduce service provision intervals, improve service provisioning, installation, service quality, improve security, and network engineering and thereby improve customer satisfaction.

34 Claims, 12 Drawing Sheets

INP Network Access Services Platform Architecture

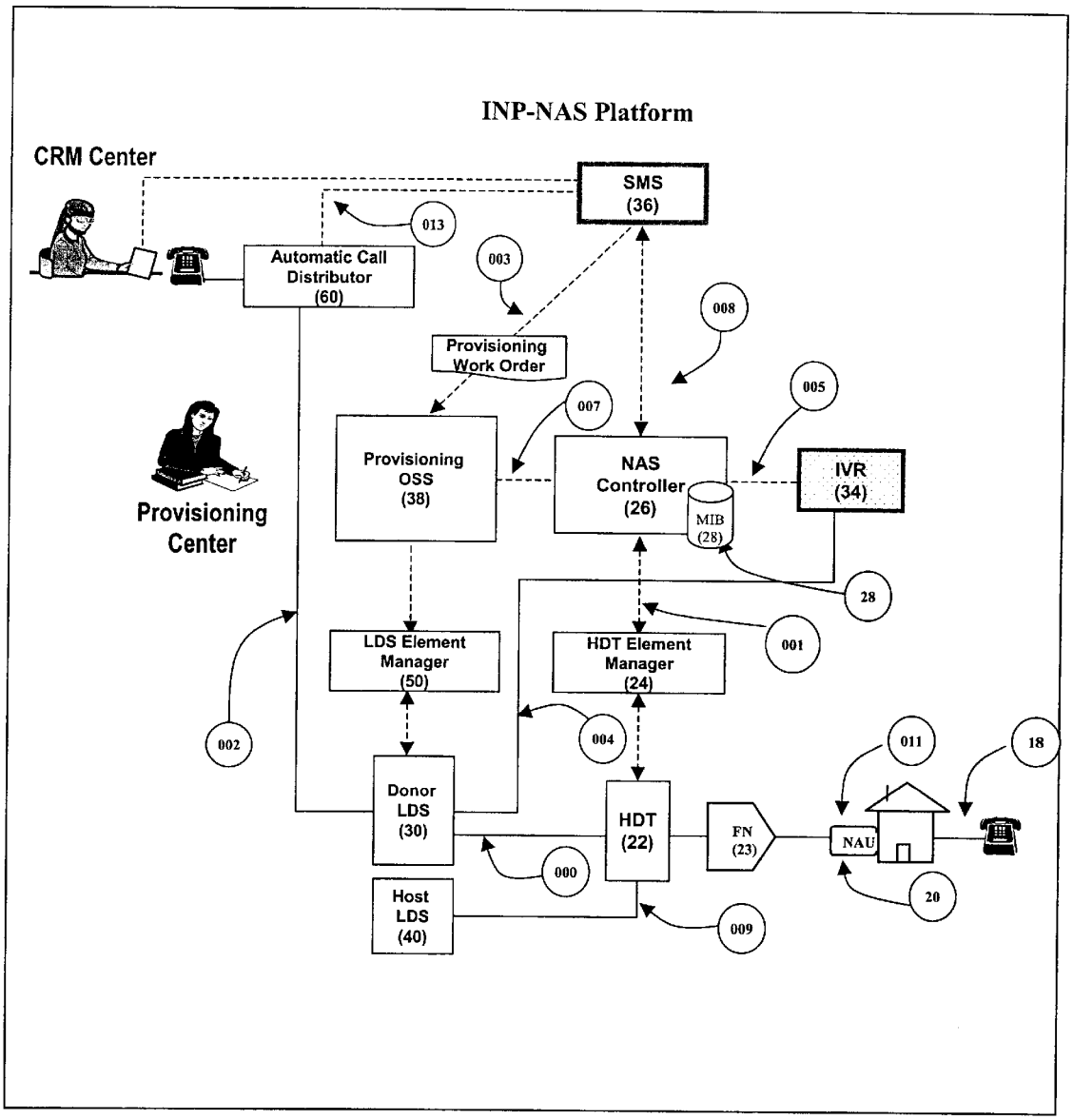
Figure 1 INP Network Access Services Platform Architecture

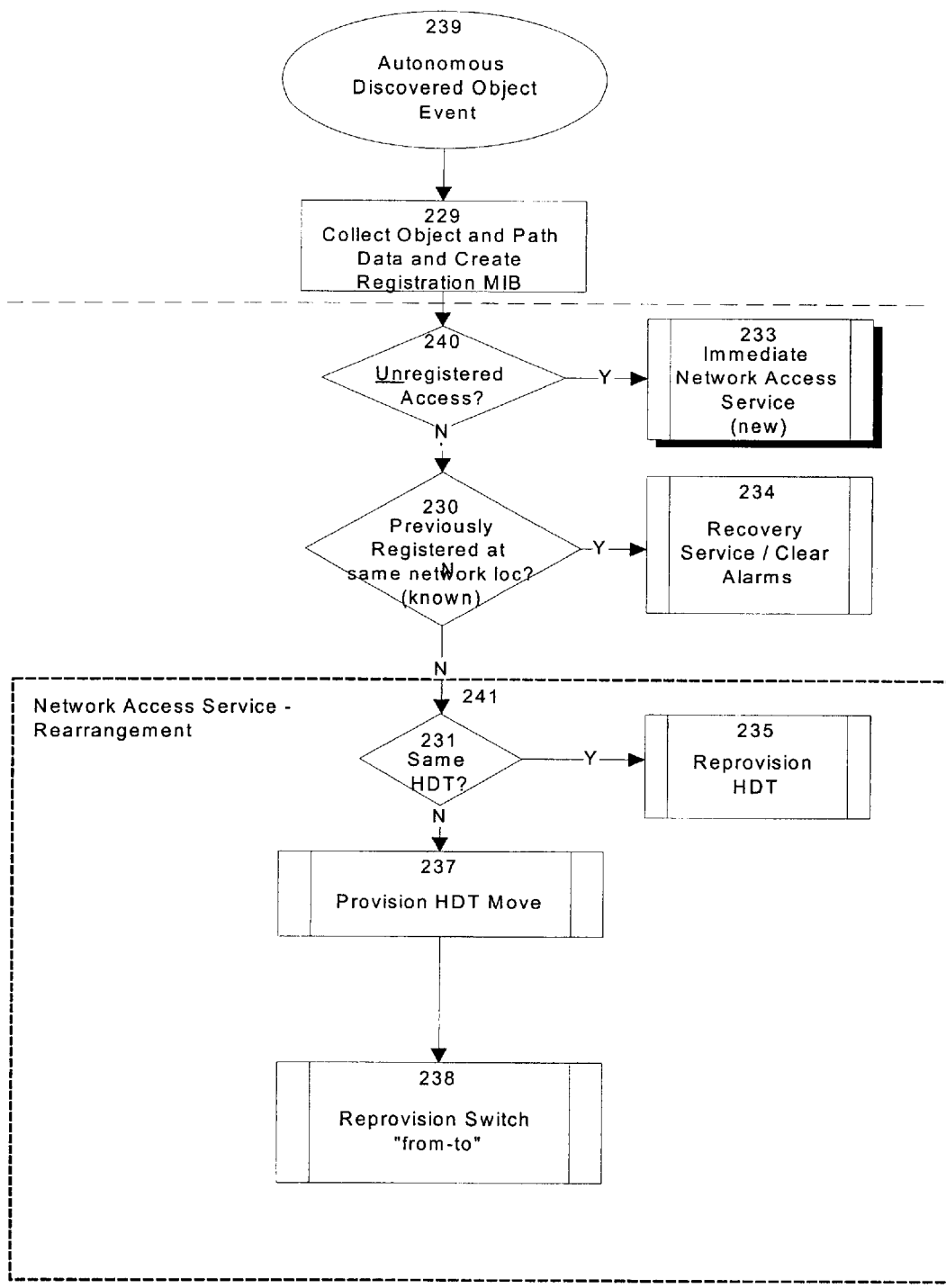
Figure 2 Top Level NAS Control Flow

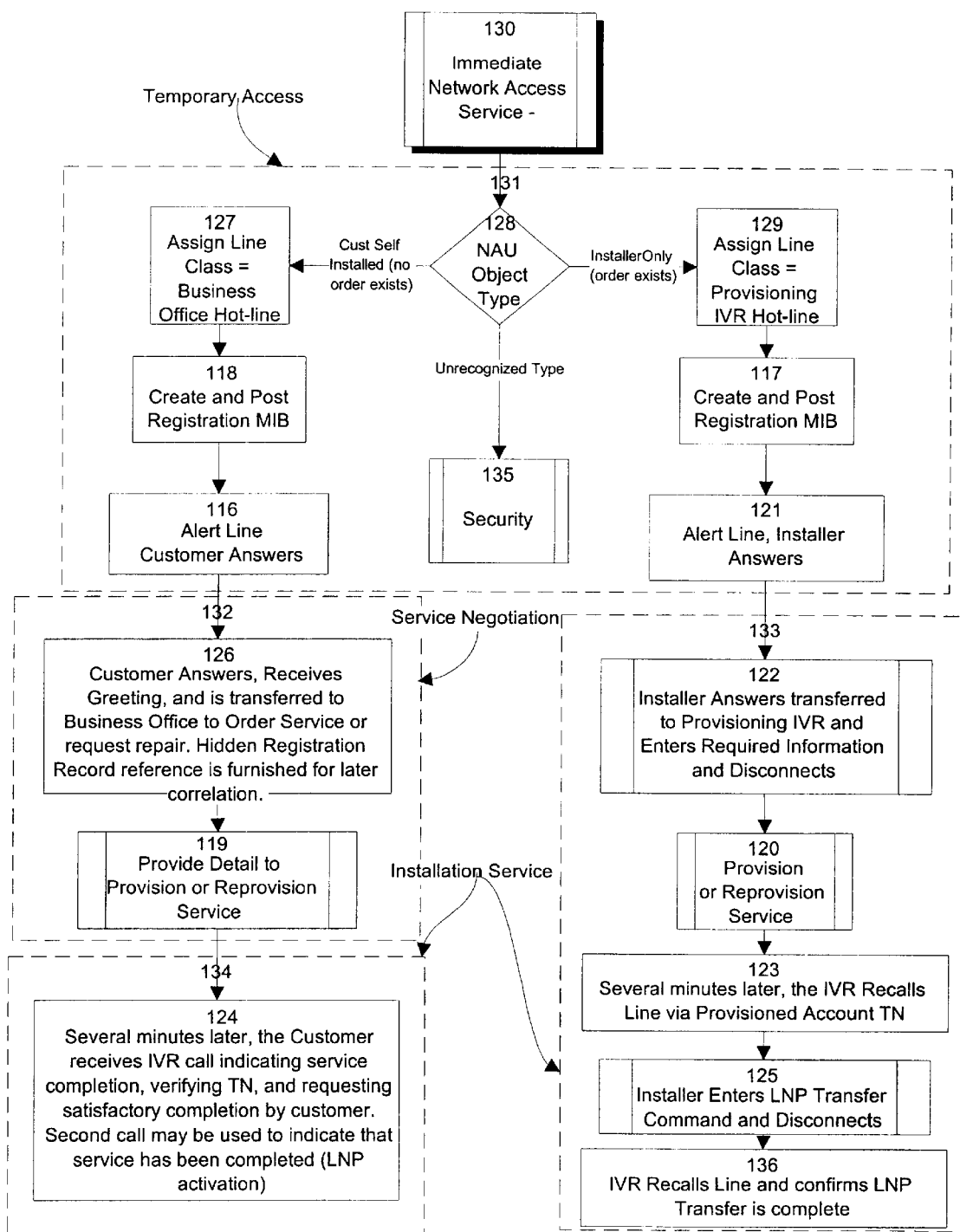
Figure 3 Immediate Network Access Service

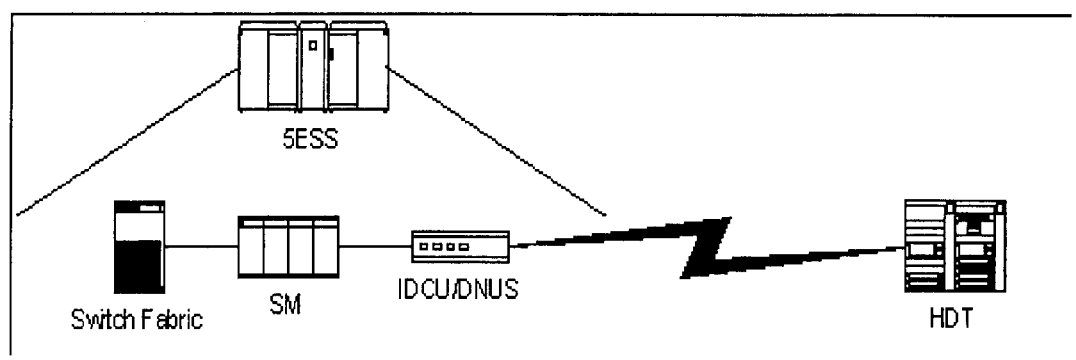
Figure 4 – Nomenclature of the Switch (LDS)

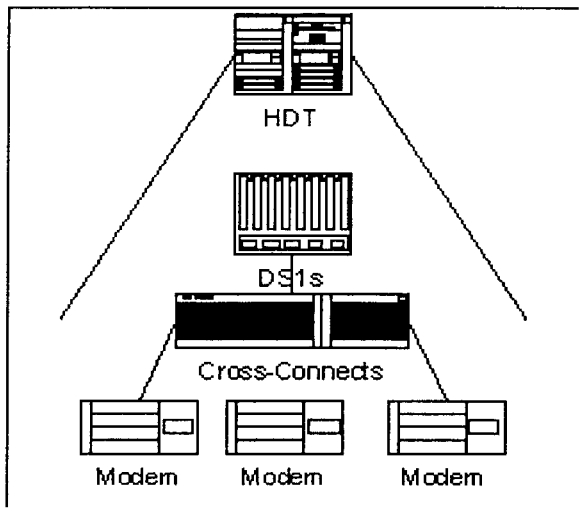
Figure 5 – Nomenclature of the Host Data Terminal (HDT)

| | Order Entry | | |
|---|---|---|---|
| W/O Number | 123456 | Disposition | Pending |
| Order Type | N | Master TN | (303) 858-3158 |
| Due Date | 06/15/00 | LNP | ☑ |
| Wirecenter | 303858 | Exchange | 303858 |

Distinctive Ring

| Distinctive Ring TN | Ring Cycle |
|---|---|
| ▶ (303) 858-5160 | B |
| * | B |

Record: |◀| | 1 |▶|▶|▶*| of 1

Features

| | Feature | Value1 | Value2 | Value3 | Value4 | Value5 |
|---|---|---|---|---|---|---|
| ▶ | /UCRFRG | | | | | |
| | /MSAAD | FWD TN=3038580001 | MSGROUP=mssgroup | | | |
| * | | | | | | |

Record: |◀| | 1 |▶|▶|▶*| of 2
Record: |◀| | 1 |▶|▶|▶*| of 2

Figure 6 – Generic Example of a Subscriber Order

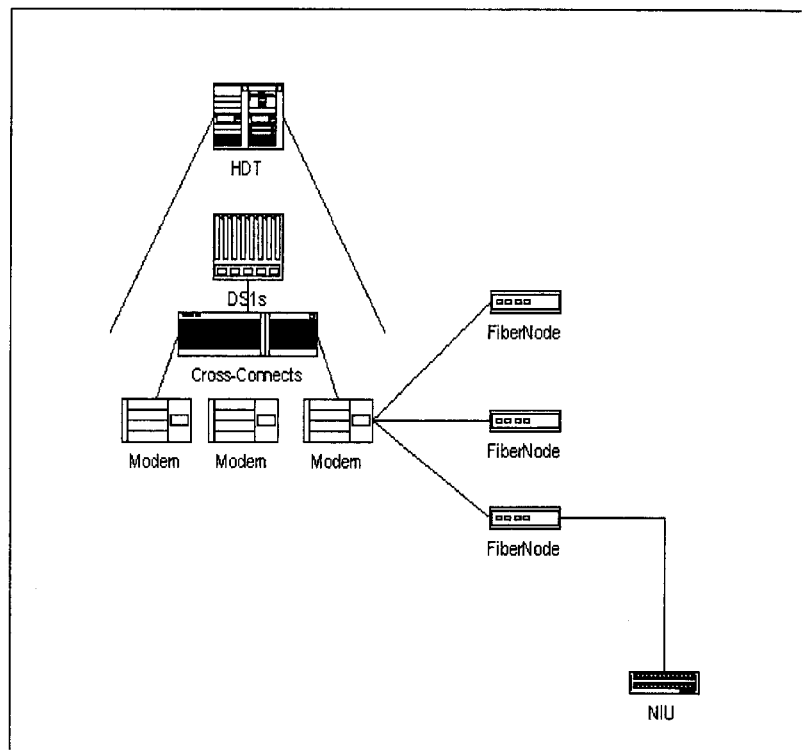
Figure 7 – Object Discovery message arriving from HDT upon the event that an NAU was powered up on the CATV network.

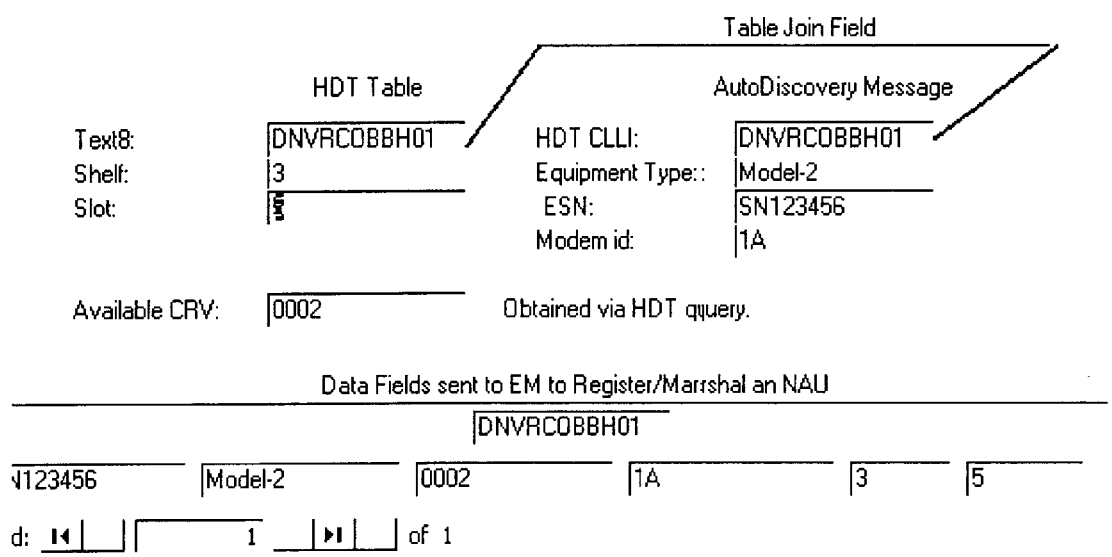
Figure 8 – Matching the Object Discovery Message to the static HDT information.

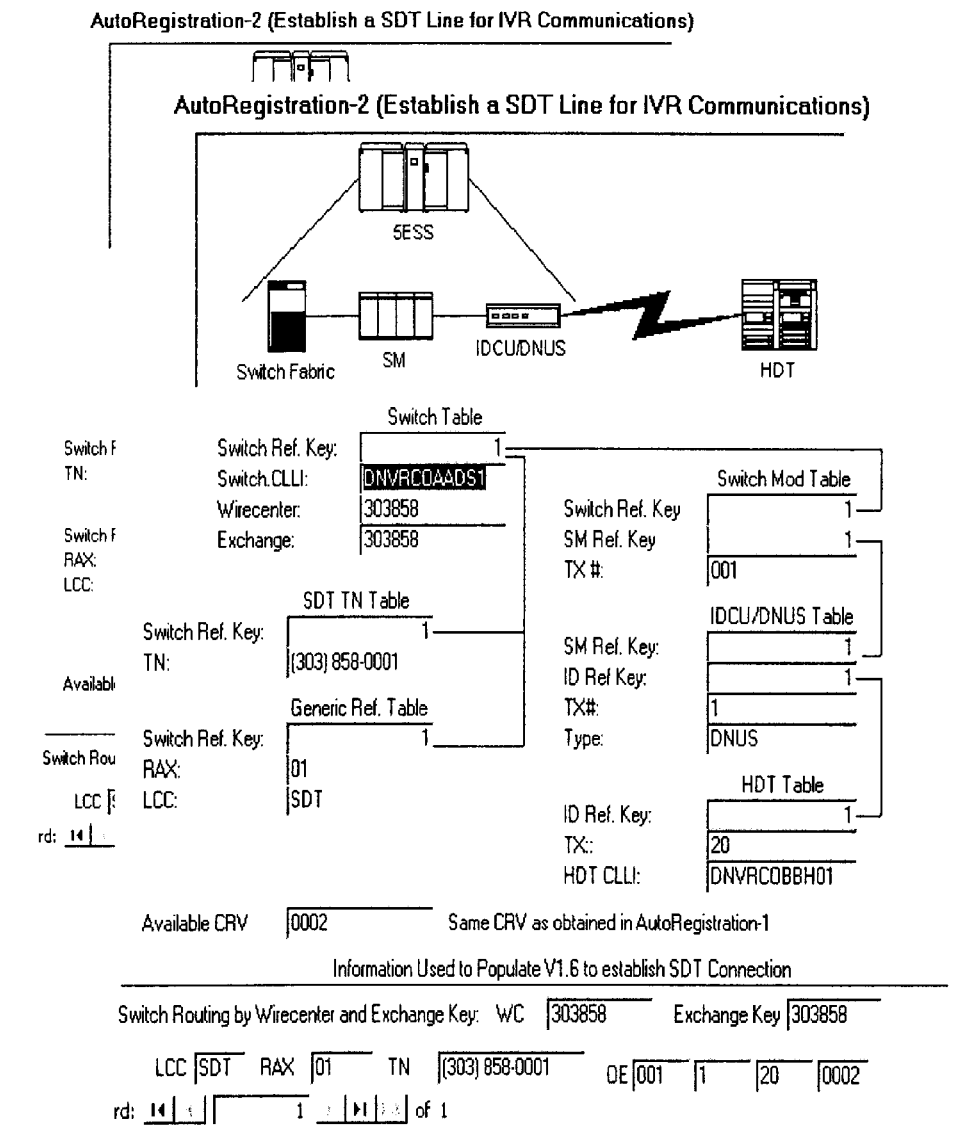
Figure 9 – Establishing an in-band communication path to enter IVR information.

IVR Message
W/O Number    |123456|
Master TN     |(303) 858-3158|
Port          |1|
Note: Master TN and Port are not needed for single line orders being provisioned on port 1.
ord: |◄| |  | 1 |►|►|| |►*| of 1
Figure 10 – The installer provides IVR information.

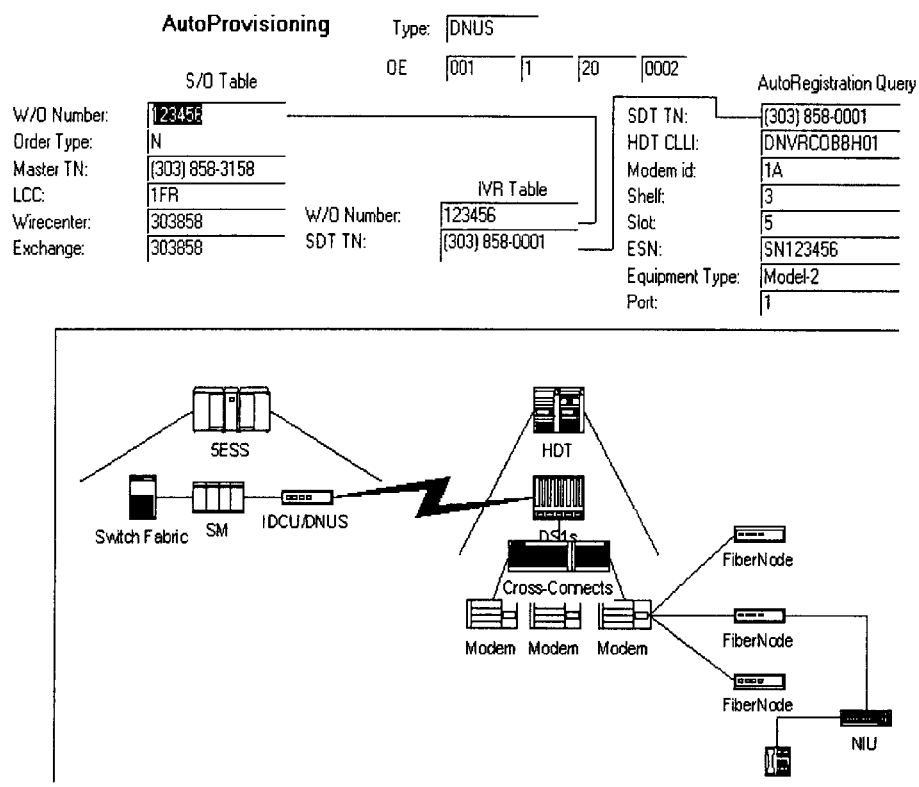
Figure 11 – The information used to establish to in-band communications channel is now correlated to the original Work Order that was entered.

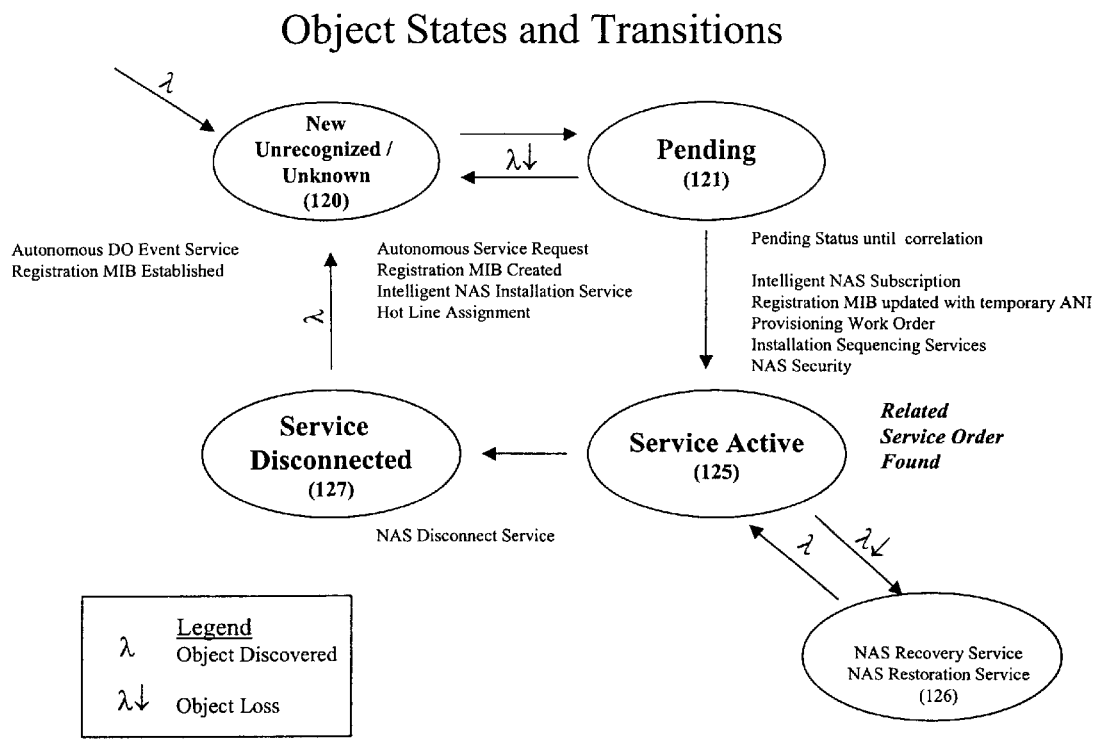
Figure 12 – Events and Services Relationship to Object State Diagram

INTELLIGENT NETWORK PROVIDING NETWORK ACCESS SERVICES (INP-NAS)

CONTINUITY

This application claims the benefits of U.S. Provisional Application Ser. No. 60/218,596. filed Jul. 17, 2000.

FIELD OF THE INVENTION

The present invention relates generally to communication and information networking and more particularly to intelligent networks which provide network access services for the benefit of network providers, service providers and customers.

NOMENCLATURE

| ACRONYM | DEFINITION |
|---|---|
| ACD | Automatic Call Distributor |
| AIN | Advanced Intelligent Network |
| ANI | Automatic Number Identification (aka Caller ID) |
| Caller ID | Another form of ANI. It is the TN of the caller |
| CATV | Community Antenna Television |
| CLLI | Common Language Location Identifier |
| CMIP | Common Management Information Protocol |
| CMS | Cable Management System |
| CRM | Customer Management Relationship is the collection of services provided to manage customer accounts. |
| CRV | Call Reference Value |
| CSR | Customer Service Representative |
| DNUS | Digital Network Unit for Sonet |
| DOCSIS | Data Over Cable Service Interface Specification |
| DP | Detection Point |
| DS0 | Digital Signal, Level Zero |
| DSL | Digital Services Line |
| E911 | Emergency 911 |
| EMSID | Element Manager System Identifier |
| ESN | Electronic Serial Number |
| FN | Fiber Node |
| FSA | Fiber Service Area is the geographic service extent of an FN |
| HDT | Host Digital Terminal |
| HDT EMS | HDT Element Manager System |
| HDTID | HDT ID |
| HFC | Hybrid Fiber Coax |
| HSD | High Speed Data |
| IDCU | Integrated Digital Control Unit |
| IDCU/DNUS | Integrated Digital Control Unit Digital Network Unit for Sonet |
| INAS | Immediate Network Access Service provides on-demand service activation |
| INP-NAS | Intelligent Network Providing Network Access Services |
| IPe | Intelligent Peripheral |
| IP | Internet Protocol |
| ISDN | Integrated Services Digital Network |
| ISP | Information Service Provider |
| IVR | Integrated Voice Response |
| LCC | Line Class Code establishes a short form of assignment of a service class to a line |
| LDS | Local Digital Switch |
| LEN | Line Equipment Number |
| LNP | Local Number Portability where a subscriber maintains their prior TN |
| MAC address | Physical multiplex address for terminating device |
| Master TN | Main line at a service location |
| MIB | Management Information Base stores data relevant to a managed object. |
| MTA | Multimedia Terminal Adapter |
| NAS | Network Access Services |
| NAU | Network Access Unit (Synonymous with NIU) |
| NIU | Network Interface Unit (Synonymous with NAU) |
| NMAS | Network Management and Activation System |
| NSP | Network Service Provider |
| QE | Office Electronics |
| OSS | Operations Support System |

NOMENCLATURE-continued

| ACRONYM | DEFINITION |
|---|---|
| PHY | Physical |
| PIG | Point in Call |
| POTS | Plain Old Telephone Service |
| Primary TN | Main line at a service location |
| PWO | Provisioning Work Order |
| QoS | Quality of Service |
| RAX | Rate Area Exchange |
| REQ-REG | Registration Request |
| RT | Remote Terminal |
| SAG | Street and Address Guide |
| SCP | Service Control Point |
| SDT | Soft Dialtone line treatment whereby a phone can only dial 911 or a business office |
| SM | Switch Module |
| SMS | Service Management System |
| SN | Service Negotiation |
| SNMP | Simple Network Management Protocol |
| Split NAU | This technique causes an NAU object to be assigned to more than one service address. It is capital efficient. |
| SS7 | Signaling System 7 network for routing and control |
| SSP | Service Switching Point |
| SUST=Y | Command that activates "Suspend Call Termination" in a Lucent ® 5ESS switch |
| TCP | Transaction Control Point as in TCP/IP Protocol |
| TDP | Trigger Detection Point |
| TN | Telephone Number |
| TR008 | Technical Requirement published by Telcordia ® |
| TR303 | Technical Requirement published by Telcordia ® |
| TSN | Temporary Serial Number is used until the correct ESN can be obtained |
| VoIP | Voice over Internet Protocol |
| XDSL | X represents the family of DSL service lines such as Asynchronous, High speed, Video, etc. |

BACKGROUND

Object and Network Discovery

As used herein the term "discovery" means the identification and characterization of all relevant information surrounding an event relating to a device being connected or disconnected on a network. The event may be the appearance or disappearance of connectivity of the device, such as a previously unregistered telephone, or any other device state change.

As used herein the term "device" means an NIU, NAU, or any form of logical or physical terminating device.

As used herein the term "Host Switch" means to designate service LDS for a customer.

As used herein the term "Hot-line" is also known as a "warm" or "ring down" line, which transfers a caller to a specific number immediately upon detection that the device connected to the line goes into an origination mode (i.e. off hook).

As used herein the term "Multi-hosting" means the association of one network element with more than one other network element. It is a form of addressing network growth in which service areas attributable to an element are overlapped.

As used herein the term "Soft-Disconnect" means the assignment of an SDT behavioral characteristic to a line. Normally the assignment to a line is permanent, but may be also termed "virtual" SDT when it is spontaneously assigned.

As used herein the term "Hard Disconnect" means that all assigned resources and physical devices are returned to inventory.

As used herein the term "Switch" means a Local Digital Switch or LDS, which accommodates provisioning of services. It may be a normal or "soft" switch providing LDS.

All forms of discovery serve to acquire knowledge and information from a managed device. Discovery has been implemented in several forms in the industry. Automatic discovery has been used in data networks implementing SNMP or CMIP and has been used for inventory and security management. It is a polled function where the network management system periodically asks, "who's there?" or "what's there?" and processes the responses. However, the current standards also allow for autonomous event reports that in the form of auto announcements. VoIP and HSD Modem vendors have implemented an autonomous registration request message (REQ-REG) that causes the network management system to note the presence of the MTA device, request data from the modem, register the device and initialize the device as appropriate. Cable modem vendors have implemented a form of discovery in which the control channels are periodically scanned to institute what is known as 'ranging' or 'marshaling' to register the NAU with the HDT controller.

Normally, if the discovered device is not expected or registered, then alarms are triggered and the device is disabled.

Advanced Intelligent Network

Advanced Intelligent Network (AIN) was developed by Bellcore to separate service control from switch logic. Its primary advantage is that it provides flexibility for offering new services but also independence of vendor services which are often implemented differently. AIN provides these services to line accounts after they are provisioned into the Local Digital Switch (LDS).

AIN defines a formal call model to which all switching systems must adhere. The call model is implemented in the LDS known as the AIN Service Switching Point (SSP), which utilizes point in calls (PICs), detection points (DPs), and triggers. The AIN architecture introduces the Intelligent Peripheral (IPe) and then utilizes the Service Control Point (SCP) to provide call guidance.

AIN SSP formal call model introduces call states to track call origination to call termination. These states include the null state (or the "on-hook" idle state) when the phone is idle. Other PICs include off-hook (or origination attempt), collecting information, analyzing information, routing, alerting, etc. In this new call model, trigger detection points (TDPs) were added between the PICs. SSPs check TDPs to see if there are any active triggers.

There are three types of triggers, i.e. subscribed or line-based triggers, group-based triggers, and office-based triggers. Subscribed triggers are specifically provisioned to the customer's line. Group-based triggers are assigned to groups such as all lines in a Centrex group. Office-based triggers are available to everyone who is connected to the telephone switching office or has access to the North American numbering plan.

Normal switching system call processing continues until an active trigger is detected. The SSP then sends the event message to the IPe or SCP and awaits instructions before continuing call processing.

Essentially. when the SSP recognizes that a call has an associated AIN trigger, the SSP suspends the call processing while querying the SCP for call routing instructions or the IPe for instructions. Once the SCP provides the instruction, the SSP continues the call model flow until completion of the call.

AIN is an event based model which adds call features to already provisioned or established lines. In contrast, the INP-NAS provides an architecture which is event based and provides network access services prior to provisioning and after provisioning lines in service.

Prior Art Network Access Services

In order to appreciate the process described herein, a few examples of Prior Art network access services will be explained. These examples are:

Installation of telephony service on a circuit based network;

Installation of telephony service on a "Voice Over IP" (VOIP) network;

Service Disconnect to Soft Dialtone; and

Network rearrangement.

Installation Services—Provisioning of Circuit Based Telephony Services

The customer must first call the business office to establish an account and request service (i.e. service negotiation). A new Telephone Number (TN) is assigned or a specific one is retained should the customer request it. The retention of a TN is termed a Local Number Portability (LNP) order. An appointment is scheduled with the customer if there is no pre-existing NAU with available inventory at the service location. These appointments typically require advance scheduling a minimum of one to three days, but can take up to 11 days for an LNP order. LNP orders require longer intervals due to the need to service negotiate and coordinate the transfer. Upon negotiation, third party provisioning functions take place and a Provisioning Work Order (PWO) is sent to the network provisioning OSS, which manages the details of network provisioning.

In respect to Network Provisioning, the network provisioning function entails three principle-provisioning tasks. (These tasks expand into multiple provisioning steps). These processes have been automated in the current art by provisioning Operations Service Systems (OSS) and provide operational benefits.

Network Provisioning Steps for a CATV telephony service, by way of example, are:

a) Provisioning the "Host Digital Terminal" (HDT) that is used to service the customer location;

b) Provisioning the telephone switch that will provide service; and c) Installation of an addressable "network access unit" (NAU) at the service location.

The order of these steps may change, depending on the equipment capabilities, such as the use of a temporary Serial Number, which enables the order to proceed without explicit detail regarding an installed device. Some vendors require pre-identification of the NAU serial number prior to step a). For these equipment types, step c) must be completed first. The execution of step c) first, has the additional disadvantage of having all problems discovered while the installation is taking place.

Step a: Determination of the communication for which a providing service path is required: This determination is made by referencing engineering drawings or by using pre-extracted data. Next, a logical communications path between the HDT modem and the Fiber Node may be assigned from inventory or the element manager. This portion of the path is termed the proprietary circuit. Next, a carrier circuit must be found between the HDT and the switch. The HDT may indicate an available circuit to a switch. The "Call Reference Value" (CRV), in reference to TR303 types of HDTs, is used to institute the logical cross-connect between the carrier circuit's shareable DS0 and the proprietary channel.

Step b: Switch services are provisioned. Activating telephony service on a line is commonly referred to as setting "translations." The selection of an assignable item from an inventory is termed an "assignment."

Several switch assignment data must be identified. The specified telephony services identified for the TN are selected along with the appropriate "Line Class Codes" and "Line Equipment Number" (LEN), or "Office Equipment" (OE), identifying the port of the switch corresponding to the previously identified CRV. Additional switch provisioning information, such as a "Rate Area Exchange" (RAX) is also specified. When these are assembled, the switch may have the translations loaded for the TN.

Step c: Installation must occur. Several calls are needed to complete installation. One call to the provisioning center to identify equipment, another call to the test center and yet another call to the provisioning center to complete LNP transfers. The installer must use a cellular phone, wireless device, or "borrow" a nearby idle line to establish a communications path.

The telephony service requires the NAU to be registered and marshaled and the circuit to be provisioned in the switch to the installed NAU. Dialtone provided by step b) from the switch will appear on the provisioned port of the installed NAU.

The installer may choose to install the new NAU as anticipated above, or may choose to provide service from a nearby NAU, if it is within cabling distance. This installation is termed a "split NAU" and is done to save considerable time and to more efficiently utilize capital equipment.

If an NAU is split, the technician must call the provisioning group to request that the provisioning be redone. This takes time and is error prone.

The NAU to be installed must be pre-registered to prevent an alarm from being generated. A provisioning Temporary Serial Number (TSN), or an electronic serial number (ESN) of the unit to be installed must be provided to the provisioning center or entered into a port on the NAU. When the TSN or ESN are used, the installed equipment is associated with the provisioning order.

After registration, the HDT modem will range or marshal without generating an intrusion alarm.

Calling a test desk using a cellular phone, wireless device, etc. completes tests of the service, such as incoming call completion and dial origination.

Finally, a call is made to initiate LNP activation to complete the service.

Installation Services—Provisioning IP Telephony Services

In respect to provisioning IP telephony services, IP networks support multimedia services and provide operations advantages for the network provider and customers. Standards, such as Data Over Cable Service Interface Specification (DOCSIS), Advanced PHY, Packet-Cable, and future standards. will enable portability of IP-based NAU equipment, termed the multimedia terminal adapter (MTA), that can be used across multiple vendor networks.

One advantage of the DOCSIS standard is that the multimedia terminal adapter (MTA) might be more easily installed. There is no inherent association of address to serving node. The MTA must be pre-authorized with the network before service can be obtained. This is limiting when new multimedia services are requested.

In the current art for IP based services, comparable provisioning installation steps to those used for the circuit telephony scenario above are needed.

The customer must call the business office and establish an account for an order to be initiated. A TN is assigned and an installation appointment is scheduled.

On the due date, the installer calls the provisioning center and furnishes the order number to prepare the network to recognize the new MTA. The call must be made from an active phone line or using a cellular or wireless phone. The installer installs the MTA, which sends a registration request (REQ-REG) to Network Management and Activation System (NMAS) which records the MAC address, assigns non-routable IP address, and downloads temporary Configuration data. (At this point, the specific customer service association is not completed.)

The installer enters an account number and order number into MTA data configuration port, which sends a message to the NMAS, which next associates these records for the service systems, such as the CMS (Cable Management System).

The installer then reboots MTA in order to get the MTA to send a new REQ-REG to the NMAS, which now understands the association to specific service.

The NMAS records the MTA MAC address, accesses customer information, assigns routable IP address and downloads correct customer specific configuration file.

Service is established.

Calls to the test center must be made to test call completion and origination.

A call to the provisioning center is made to initiate LNP activation.

Service Disconnect and Impact on Network Utilization

When a customer terminates service, a disconnect order is issued. Providers benefit by implementing a SDT service because this saves dispatching a technician to remove and subsequently reconnect the line, when the next customer requests service at the same location. SDT is assigned to the line for a number of days after any disconnect occurs and is sometimes required to be permanent if Public Utility Commission mandates. A first order implements SDT by potentially changing the name and TN on the account and places SDT characteristics on the line, which blocks originating and terminating calls, except for Emergency 911 (E911) and access to the business office. A second order is usually scheduled between 30 days to 90 days and creates the final "hard disconnect" which occurs when the NAU is physically returned to inventory.

If another subscriber at the same location orders new service (as might occur in the event of a move), then the new subscriber will take over the facility assignments associated with the SDT and the service can be activated without the need for a dispatch. Disadvantages of this approach are the allocation of the SDT switch resource ties up inventory and generates the second order that must be cancelled if another subscriber at the same location accepts service.

Network Rearrangement—Capacity Management Related Service Requirements Circuit Switched Services over a Cable Network Engineering must periodically perform network capacity management services. If additional network capacity is needed in a network, engineers have to enlarge the network and therefore "grow" or "split" the "FiberNode Service Areas" (FSA) into two or more FSAs. This function is needed to maintain the ability to service customers and maintain a high grade of service as the numbers of customers requiring service are added to network segments. This ensures that subscribers are given the same service that they had prior to the network engineering change. The process of re-configuring the network typically requires cabling to be moved and perhaps hundreds or thousands of switch translation changes to be performed. This requires substantial inventory management associated with LEN/OE and CRV reassignment. The reference to CRV is understood to pertain to TR303 types of remote terminals. However, in the case of a TR008 remote terminal the word "port" is recognized, applicable and substitutable for CRV. Also, from a switch's view, the HDT appears to be a remote terminal. Existing databases must be accurately restructured in order to maintain service. Retranslation of network elements may be necessary, when the service path is rearranged, the LEN/OE/CRV and other assignments will change. Done improperly, this activity negatively impacts the QoS and has high associated costs.

Multi-hosting addresses capacity exhaustion by allowing several switches to serve a common HDT. This is similar to having overlapping FSAs. The association of an address to a unique serving network becomes ambiguous to ascertain by examining network maps.

Problems Associated with Prior Art

Prior art entails the mechanization of manual provisioning and installation processes. As such, there are numerous limitations and points of failure. AIN services apply after provisioning is completed and does nothing to improve these issues.

Provisioning accuracy is a problem. It is not currently possible to achieve 100% accurate provisioning because of data quality. A number of data related problems must be resolved to successfully provision a subscriber's service.

Any one error in the assignment of data from inventory will result in a failure to institute service. When dozens of data elements, each having less than 100% accuracy, are used to provide service, the probability of service fulfillment generally drops significantly (typically ranging between 60% to 95%). In the event that service is not properly fulfilled, the difficulty of locating the provisioning problem is tedious and time consuming.

Inventory data containing physical and logical resources identify both in-service and available network elements and resources. The service address to FN and HDT node associations must be accurately stored in a database similar to the common "Street and address" Guide (SAG). The accuracy of these data ranges can be from 60%–95% due to the ambiguity of addresses on network maps. These data are costly to collect and make 100% accurate. Additionally, the transport inventory must be correct to avoid a conflict when LEN/OE/CRV/PORT assignments are made.

Service delays are a problem. If a service cannot be customer-installed, a technician is required. Technician appointments must be scheduled weeks in advance.

Installation delays are a problem. If the installer encounters data problems, installation will take longer than expected, and can cause subsequent appointments scheduled for that day to either be missed or delayed. Additionally, the probability the customer will cancel service increases significantly. Installation objectives and customer satisfaction metrics are negatively impacted; and if cancellation of service occurs, the company will lose revenue. Installation costs rise due to necessary overtime.

Alarms are a problem. There are between hundreds and tens-of-thousands of active alarms in the network at any one time. As described, unregistered discovered objects generate alarms that further overwhelm the service assurance centers and they are not able to deal effectively with valid alarms. A high degree of data overload may cause a lower grade of service because network technicians become desensitized to alarms.

Other service affecting problems are involved. One area of network engineering that impacts network quality of service and has high cost is network capacity management. In the event that additional network capacity is needed in a CATV network, engineers sometimes plan an "FSA split" into two, or more FSAs. If done incompletely, the customer will lose service.

Staff efficiency is a problem. Human interactions introduce more errors, delays and inefficiencies into the process. Fewer lines are placed into service than if no interactions were required. Communications required between the installer and the provisioning staff is inherently error prone when human transcription and/or entry are required. The installer must remain on-site to test the telephony connection and provisioned services before leaving for the next installation. These steps require multiple calls to the service repair centers or to test lines. The installer must either use a cellular or wireless form of communications, or must "borrow" an idle in-service line; the network communications at the site are unavailable for installer use.

Quality of Service (QoS) is a problem. The second disconnect order issued may result in disconnecting of the new subscriber if the order was not properly cancelled. The second order to disconnect service entails extra workflow management, increases the order volume and potentially creates troubles.

Detection of Service Problems is a problem. Once service has been provided, customers, who then register complaints, often are the first to discover network service problems. Network outages due to power failures, lightning, or other impairments, may cause the equipment to lose the proper provisioning associations. Current networks have limited ability to recover from these outages.

BACKGROUND, SUMMARY AND OBJECTS OF THE INVENTION

The Intelligent Network Providing Network Access Services (INP-NAS), as disclosed herein, implements services for communications and information networks. Based on Object and Path Discovery (reporting data and the state change of a network element), this invention automatically initiates services and management applications benefiting Network Providers, Service Providers, and customers. A service controller (NAS Application Controller) provides these applications and integrates them with management systems and provisioning systems to provide services described herein.

The invention applies to any type of addressable network arrangement for voice, data, image, and video networks with any type of access arrangement. It applies to primary dedicated networks and secondary dial-up networks, such as Information Service or Data Networks. It supports point-to-point, point-to-multipoint, and bus architectures, wireline, wireless, fiber, radio, and optical network technologies. It applies to communication technologies such as analog, and digital, circuit and packet utilizing protocols such as Internet Protocol (IP).

"Object Discovery", the technology enabler for this invention, provides data collection of the object and network path for use by the NAS Applications. Object discovery reports significant events (state changes) such as; unit on-line or off-line, device reset, power interruption, network rearrangements and changes, installation and construction activities, and other things affecting the network connectivity and control of this object. The primary benefit of the Object Discovery is that it minimizes dependency on pre-collected data.

This invention provides ease of access and improves service quality services to customers, and revenue generation and operations savings services for network providers and service providers. The Network Access Services are implemented as NAS applications. The discovery event is used to initiate a set of applications that provide the following services:

Access to network and information implementing "service on demand." "Service on Demand" has been a longtime goal in the communications and information service industry. The Immediate Network Access Service supports customer self-installation to produce an immediate activation of service without requiring a qualified technician to perform the installation. It also supports the technician installation process, automating the installation steps significantly improves the efficiency and predictability of installation. Customers benefit by getting service when they want it, and Service Providers benefit through earlier revenue generation and reduced operations costs.

Intelligent routing to Business Office or Provisioning Interactive Voice Response (IVR) based on classification and identification of element types resulting in services appropriate to the element being serviced.

Automatic arrangement of network elements to provide a service configuration.

Simplified access to the Business Office to negotiate new services and to activate services "on-demand."

Automated services for technicians to reduce installation time frames.

Service assurance (such as; reprovision and recovery, filtering of alarms, and move services) resulting in improved customer satisfaction.

Automatic support for network rearrangement of the network topology by network engineering.

Supports Operations Support Systems (OSS) used to maintain, provision, or engineer networks and improves Customer Relationship Management (CRM) services; and Security services appropriate to the intervention.

An essential component of this invention is the use of Discovered Object events to initiate a set of services in a meaningful and beneficial manner. For example. "Service on Demand" uses the discovery of an unregistered network access unit (NAU) object to assign a dedicated hot-line. The term "hot-line" is synonymous with the telecommunication's reference to a "ring down" circuit. (A hot-line causes an automatic transfer to a pre-established number, such as the Business Office when the originator picks up the phone.) Another example of a beneficial service can be offered if a discovery event of a registered NAU results from a service disruption. In this situation, it is appropriate to implement one or more "self-healing services" to automatically restore service. In traditional networks, the discovery of an unregistered object (a.k.a. unknown device) initiates network security services to block access, log an intrusion alarm event, and dispatch a technician to investigate the alarm and perhaps eliminate the intrusion.

This invention facilitates access, while the traditional method blocks or restricts access. This invention reverses the traditional security paradigm. It enables potential customers to easily gain access to network services on demand, while intruders seeking to improperly access services, are fully discovered and become highly visible to the network provider; thus exposing their identity and location.

Some of the benefits of the invention are briefly described:

Object discovery eliminates complexity and costs associated with inventory creation and data collection (required for inventory management for traditional networks). The class of access services initiated offers significant value.

Provides "Services on Demand" (using the INAS) enabling customer self-installation: Scheduled appointments for the installation of NAU equipment normally can be eliminated. Installation delays leading to customer dissatisfaction and loss of revenue for the provider are eliminated.

Establishes new service delivery distribution channels enabling a travelling sales person, retail distribution to customer, or a technician to provide on-demand services when required.

The "just in time" method of this invention ensures accuracy of data. Since the network and element data is collected as a result of Object Discovery, the data are 100% accurate. (Causes of data inaccuracies stem from many sources and will be explained later.)

Inventory is allocated via a continuous process rather than the normal process where inventory is determined quarterly or annually, resulting in excess inventory in growth-oriented industries in order to meet next period needs. With this invention, each assignment results in an inventory order enabling more efficient utilization of capital-intensive resources. This field is referred to as Capacity Management.

Efficient utilization of network capital resources. For example, in traditional networks, Soft Dail Tone (SDT) service requires the permanent assignment of switch resources to lines that are non-revenue generating. While SDT services provide benefit by eliminating the need to rework the physical installation and avoids a dispatch to a previously serviced address, this inefficient utilization of network resources requires non-revenue generating telephone number accounts in the switch for each line given this type of service treatment. This is of concern to engineering and to Public Utility Commissions seeking to minimize costs for the consumer. INP-NAS INAS draws the SDT resource from a pool and returns the resource to the pool typically within one hour. The service requires resources only until activation of the permanent service.

The use of "just in time" method eliminates the need to pre-provision services. Pre-provisioning is needed in current networks because of data inaccuracies and the time-consuming nature of provisioning. Eliminating pre-provisioning has the benefit of reducing extra work on orders provisioned that are cancelled, supplemented, or changed before the due date. Normal pre-provisioning of a Local Number Portability (LNP) order requires that an unconditional trigger be assigned to the telephone number (TN) account in the switch to redirect local calls to the correct final destination by referencing the SS7 network's LNP database(s) (since the original TN may be in service on another switch). After activation, the unconditional trigger is removed so that the local switch calls complete locally without referencing the SS7 network. One benefit is that SS7 transaction charges for all calls requiring the extra LNP activation lookup are not required.

Representative NAS Applications Types are:

1. Immediate Network Access Services (INAS) provide new NAU with network access in order to negotiate services. These may be subscriber services or "on-demand" session-only services. Such services apply to dedicated and remote networks. Examples of INAS are Service Negotiation and Installation.

2. Service Negotiation (SN) delivers an unrecognized caller to a Business Office or to a subscription screen of a service provider. Automatic identification of the network path and the equipment type of the customer enables the agent to handle service and trouble calls more accurately and efficiently.
3. Installation NAS improves customer service. Installation NAS enables fast and accurate installation of equipment. Installation NAS Applications automate the installer process eliminating much of the uncertainty and wasted time associated with provisioning of services. On dedicated networks (such as CATV network or POTS, or ISDN) permanent service can be furnished quickly after Object Discovery, and may be provided without the need for an installation appointment, providing the customer is furnished with an NAU appropriate for self-installation. Thus this service supports customer self-installation and supports traditional technician installation.
4. Repair NAS provides for more rapid and accurate repair activities when equipment is to be replaced or upgraded by utilizing discovered object data for the replacement NAU to be used to substitute it for the faulty NAU. Three forms of repair have been identified: (a) supporting the replacement of a NAU (like), or (b) NAU (unlike) or (c) supporting port reassignment.
5. Upgrade NAS for NAU substitution (unlike)
6. Restoration NAS applications improves the quality of service (QoS) for communications networks by implementing automatic restoration. This invention discloses a method enabling automatic recovery from service disruptions caused by several events such as human error, electrical interference, and power outages.
7. Network Rearrangement NAS Applications automatically support the rearrangements required, thereby eliminating the error prone and precise work associated with the need to design and execute the engineering changes. The costs and errors associated with such changes are minimized or eliminated.
8. Inventory Management NAS Applications provide more efficient utilization of network resources by allocating them only when and where needed, minimally retaining them in service, and automatically reordering replacement inventory when necessary.
9. Access—Automatic Device Registration—This service recognizes an object and creates the registration MIB which is the basis of all applications within INP NAS.
10. Access Initialization—Assignment of communications path using for example, Virtual Hot-Line or SDT.
11. Network Security—Service is triggered if event does not warrant as any other service type. In addition, the full characterization of the discovered object facilitates identification of intervener.
12. Immediate Access NAS—Supports spontaneous access which may have a service duration of one session, such as Pay per View or Pay per Session services.
13. Disconnect—NAS—Supports (a) Hard type disconnect releases all resources to inventory, or (b) Soft type uses SDT service to preserve the service arrangement or (c) disconnect—to Virtual SDT—using Access Initialization upon first off-hook rather than object discovery. This provides better utilization of switch and network resources.
14. Customer Move (to/from)—Relocation service allows service to "follow customer" to new location if it is within network range.

ISP-NAS—Immediate Network Access Services provide benefits to Information Service Providers (ISPs), Network Service Providers (NSPs), subscribers, and on-demand customers. Normally a security failure results in "denial of service." In this invention, the "security event" announces that an unregistered terminal object is seeking entry or service. ISP-INAS provides a more beneficial service by delivering the interested user to a registration service and upon successful registration the INAS generates and automatically downloads a configuration file (customizing the customer access dial scripts with the appropriate security and login data) so that future dialup results in a successful access. Said file can take the form of a dial up script, a traditional initialization file, or a cookie enabling subsequent recognition by INAS.

A "pay per session" ISP service is a logical extension of the said INAS described. The INAS could implement on-demand services to charge by the day, by the session, or by each use, (in effect opening up networks to anyone requesting information services—not just for subscribers) by integrating to security and billing services.

The Intelligent Network Providing Network Access Services (INP-NAS) implements an architecture and services for communications and information networks. Based on Object and Path Discovery (events reporting the state change of a network element), the invention automatically initiates services and management applications benefiting Network Providers, Service Providers, and customers. A service controller (NAS Application Controller) provides these applications and integrates with management systems and provisioning systems to provide services described herein.

Object Discovery, the technology enabler for this invention, provides data collection of the object and network path for use by the NAS Applications. Object Discovery reports significant events (state changes) such as; unit on-line or off-line, device reset, power interruption, network rearrangements and changes, installation and construction activities, and other things affecting the network seeing this object. The primary benefit of the Object Discovery is that it minimizes dependency on pre-collected data. This invention provides ease of access and service quality services to customers, and revenue generation and operations savings services for network providers and service providers. The access services are implemented as NAS applications.

A set of Network Access Services (NAS) for circuit and VoIP telephony is described for CATV networks. These services can be easily extended to other network types.

The chief advantages and key objects of the invention include reduced expenses, increased service quality, with higher revenue generation for the network provider that implements this NAS invention. By supporting customer installation, the flexibility of obtaining telephony INAS on a time frame that is amenable to their unique schedule, i.e. no installation appointment is necessary by applying this invention. Benefits of the invention include:

INAS provides instant communications service to customers eliminating the need for a qualified installer. This invention allows subscribers to install their own service equipment eliminating the need for an appointment and installer.

This invention automatically guides the subscriber installing equipment directly into the business office enabling INAS. INAS includes service negotiation and service activation.

Improved Customer Servicing—Information regarding the customer's reason for call, equipment type, serial number, number and type of available ports, and other details can be furnished to the business office or repair office improving the servicing and quality of call handling. Multiple service NAUs such as voice and data for circuit networks, or for IP networks can be better serviced.

Both the installer and customer utilizes the pre-service communication path associated with the NAS—Installation and not need to use a separate wireless telephone or to "borrow" a dial-tone from an idle line. All service are provided by the newly discovered equipment. Alternate means of communications are only needed in a limited number of cases when service does not complete successfully.

Quality of Service: A higher degree of service accuracy is possible. The 95–97% accuracy (typically the best case) for data increases to nearly 100% because it is furnished "just-in-time" when needed via the access network.

Costly data collection and maintenance are virtually eliminated. The benefit is reduced cost and less time wasted. The need to maintain data is eliminated since it is furnished only when needed by the network.

No prior knowledge concerning a subscriber's service location need be collected and saved in inventory databases prior to provisioning the required telephony services.

No relationship between a subscriber's location and the HDT need be pre-defined in the databases.

A pre-determined inventory is not needed: Rather than storing assignable inventory and assigning portions of the inventory to allocate facilities for provisioning, data items can be obtained directly from the network itself.

Costly installer time is reduced because the process is automated for the installer. The invention automates the installation sequence. The installer's time at a subscriber's service location is minimized. Therefore, installer efficiency is maximized and the number of installs that can be completed each day increases.

The customer and installer are alerted as installation progresses, eliminating the need to "watch" progress indicator lamps.

The installer need not communicate with any other person when placing a NAU. Communications are only required if an error condition arises or if the installer wishes to communicate with provisioning personnel.

Speeds the replacement/repair process by allowing services provisioned onto one NAU to be easily transferred to another.

Allows for the automatic reconfiguration of service if the network is re-engineered. Subscriber service integrity is maintained with minimal, if any, human intervention.

Provisioning of lines having standard service packages is possible by assignment from pools of identically provisioned lines. The benefit is that provisioning which is time consuming and costly in terms of switch load, can be moved to low traffic hours permitting faster service activation.

Inventory of pre-established hot-line and permanent resource pools can be kept to a minimum by "just-in-time" association with a corresponding inventory replenishment order being generated.

BRIEF DESCRIPTION OF THE DRAWINGS

The drawings depict the functionality of the invention as it pertains to provisioning telephony on a CATV network.

FIG. 1 illustrates the platform architecture of INP-NAS;

FIG. 2 depicts a top level network access service (NAS) control flow;

FIG. 3 depicts an immediate Network Access Service (NAS);

FIG. 4 depicts nomenclature of the Switch (LDS);

FIG. 5 identifies nomenclature of the Host Digital Terminal (HDT);

FIG. 6 illustrates a generic example of a subscriber order;

FIG. 7 depicts the Object Discovery message arriving from the HDT upon the event that an NAU was powered up on the CATV network;

FIG. 8 shows the correlation that occurs between the object discovery message (FIG. 6) and the static data that was maintained about the HDT (FIG. 4);

FIG. 9 illustrates the manner in which an in-band communication path is established to enter IVR information;

FIG. 10 depicts the information that is transferred from the installer to the NAS via the IVR.

FIG. 11 illustrates how the information is used to establish to in-band communications channel in correlation to the original Work Order; and FIG. 12 depicts the relationship between events and services to Object State Diagram.

DETAILED DESCRIPTION OF THE ILLUSTRATED EMBODIMENTS

This INP-NAS invention becomes operational with a minimal set of data. The data elements that must be provided to initiate the functionality is a description of switch nomenclature and the relationship to an HDT. The HDT must also be described with a minimal set of information and will be used in the ranging/marshaling of an NAU and the activation of a port. In the absence of any other configuration information, port 1 of the NAU is activated to facilitate the telephony drop. In respect to the switch description information and HDT, the numeric identifiers that make up a LEN/OE must also be provided.

The inherent functionality of the NAS application will be described hereinafter and include:

Processing of a new connect order (LNP and non-LNP);
Processing of a change order;
Processing of a disconnect order (LNP and non-LNP);
Rearrangement or reconfiguration of an HFC or telephony network; and
Repair functions.

Orders can be entered into an SMS as they arrive. Every order has a due date by which the service is to be instituted (i.e., a new connect order), changed (i.e., a change order), or disconnected (i.e., a disconnect order). However, it is possible for a subscriber to either cancel an existing order, or change the previous order with respect to line features and due date. Changes that take place on pending orders are referred to as "Supplemental Orders." The method by which the NAS application identifies the correct order to be worked is by reviewing the "auto-sequence" number that will always be present in the relational table that holds the pending orders. The underlying basis of the NAS application's data store described herein is a relational database. The "auto-sequence" number is a primary key field in the table. Supplemental orders and the identification of the correct order to be processed are found by reviewing the auto-sequence number. Simply, all orders that have the same subscriber order numbers are extracted from the table. The entry with the highest "auto-sequence" number is the correct order to be processed.

The INP-NAS implements an Object State Model identifying states for access equipment. Normal states include "new", "pending service", "service active" and "service disconnect." State transitions and services depend on the Autonomous Object Discovery event. Normal permanent service is provided to a subscriber from the "service active" state. Temporary or session-only services are supported from the "pending service" state. Services described herein are shown as being triggered from specific states.

With respect to new connect orders, the Object Discovery is triggered by powering of the NAU or connecting the NAU to a CATV network. The HDT, after ranging or marshaling the NAU, issues an autonomous Object Discovery message to the HDT Element Manager. The element manager will "package" the data from the HDT and append an "Element Manager System Identifier" (EMSID) before issuing an autonomous message to the NAS application described herein. The message from the Element Manager will contain an EMSID, HDTID, Equipment Identifier of the NAU that was powered up, the ESN (electronic serial number) of the NAU, and the modem identification that resides within the HDT that received the message from the NAU that it had been powered up on the CATV network.

Upon receipt of the message from the Element Manager that an NAU has been discovered, the NAU will be immediately directed to range/marshal the NAU and activate the port that will provide the in-band communications path. The LEN/OE will be calculated and verified by accessing the donor switch, or the shadow database of the donor switch's shadow database (i.e., the mirror image of the switch's "Office Defined Database"). After ensuring that no conflicts exist, the NAU will be ranged and the port activated.

FIG. 1 illustrates the platform architecture of an INP-NAS. When an NAU object 20 is discovered (such as an unregistered NAU) and communicated to HDT 22 and thence to HDT Element Manager (HDT EMS) 24, a transaction is sent via path 001 from the HDT EMS 24 to the NAS application controller 26. Said transaction contains all required data for Object Discovery including NAU type, serial number, HDT identification, HDT Element Manager identification, and path data (later detailed). The controller 26 classifies NAU type as having capability for customer or technician installation and initiates the registration MIB 28. Based on classification, controller 26 next assigns the appropriate temporary hot-line service from a pool of like hot-lines established to provide call connection to a specific service point (or dynamically provisions a line) in the donor LDS 30. The assignment of a temporary hot-line establishes the temporary service path 000 by controller which completes the circuit.

If a customer installable type of NAU is determined, then a temporary hot-line is assigned to transfer caller to CRM Center. The phone 18 is alerted (i.e., ringing). When the phone is answered the customer is connected to the CRM center 32 along path 002. The CRM center 32 Automatic Call Distributer (ACD) 60 records the ANI of the temporary hot-line 000 and forwards same to the SMS via 013. Upon completing service negotiation, a provisioning work order from SMS 36 is sent to a provisioning OSS 38 along path 003, and a transaction with the work order number and temporary hot-line ANI is sent to the application controller 26 to update MIB 28 via 006. This transaction provides data for correlation of the proper MIB with the specific work order utilizing the TN of temporary hot-line 000. NAS application controller 26, upon receiving the work order number and the TN of assigned hot-line correlates registration data in the MIB 28 containing TN of temporary hot line with the provisioning work order in OSS 38 and supplies along path 007 desired final data to provisioning OSS 38 to complete provisioning of permanent service. When final service along path 009 by host LDS 40 is provisioned the temporary hot-line service is returned to the donor LDS pool or inventory.

If technician installable type of NAU is determined, then OE/CRV of temporary hot-line pre-established to transfer installer to provisioning IVR is assigned. The phone 18 is alerted (e.g. ringing), which in this case is the technician's phone, and when the phone is answered, the technician is transferred to IVR 34. The technician enters a security entry code and selects activation from a menu, and enters data relating to the service order, such as job number, permanent TN, etc. The IVR 34 sends transaction to controller 26 containing technician entered data and temporary hot-line ANI. Controller 34 next correlates data in the MIB with provisioning work order contained within Provisioning OSS 38 utilizing temporary hot-line TN and permanent TN entered by technician.

It is also possible for the technician to be performing a repair activity. In this case, the new NAU object is discovered and a similar flow occurs. When the technician is connected to the IVR, and enters a security entry code, selects replacement action from a menu, and then enters data relating to the service order, such as job number, and either permanent TN, or serial number of the unit being replaced. IVR 34 sends transaction to controller 26 containing the data and temporary hot-line ANI. Controller 34 next generates a transaction to the provisioning OSS 38 which effects the substitution of the replacement NAU for the faulty NAU.

Restated, with NAS Applications, a new NAU Object Discovery results in the creation of a Registration MIB (management information base) and a corresponding event transaction along path 001 that initiates the NAS Applications Controller 26. Object and path discovery results in 100% accurate data being supplied for use to NAS controller because the information comes directly from the network elements. Discovery occurs in the access network of the HDT/HDT Element Manager (HDT EMS).

At this points controller 26 determines the method of operation via classification of NAU type. If the NAS Controller 26, upon detecting the NAU at 20, classifies the NAU as customer installation, it next assigns a CRM type hot-line (LDS hot-line pool is managed by the controller 26) and registers the TN in registration MIB 28. The hot-line (a.k.a., a ring down circuit) can also be instituted upon demand, as depicted in FIG. 9 in the "Brief Description of the Drawings" section of this specification. NAS controller 26 sends an alert command to HDT 22, phone is alerted and customer next answers phone. The customer is greeted with a welcome message from the donor LDS 30 and is immediately transferred to the CRM center 32 where service negotiation takes place. Said transfer occurs via LDS hot-line path 002. The hot-line "Automatic Number Identification" (ANI) of the TN is communicated along path 008, recorded by the SMS 36 and is subsequently passed along path 003 with the order to Provisioning OSS 38 to complete provisioning and service activation. Service can be active within a few minutes after the order is taken.

For technician-installed equipment, the customer must have previously placed an order for service. If the NAS controller 26, upon discovery of NAU at 20, classifies said NAU as installer type, it assigns a provisioning IVR hot-line. The installer is alerted from the NAS Controller 26 and answers phone. The "Local Digital Switch" (LDS) hot-line 004 delivers technician to Provisioning IVR 34 for login and awaits instruction and supplemental information to be entered. Provisioning IVR 34 forwards collected information such as work order number and the ANI of the hot-line to the LDS 30. The work order number in this scenario is needed for the NAS controller to correlate the existing Work Order with the Registration MIB data. The ANI (TN) of the calling line enables the NAS controller 26 to correlate information in the appropriate Registration MIB 28. NAS controller next causes Provisioning OSS 38 to complete service activation within minutes.

One significant advantage of the invention is the virtual elimination of the dependency to predefine data necessary to provision service. Processing of data in accordance with prior art techniques creates initial inaccuracies, or subsequently becomes inaccurate by changes that are incompletely recorded. A second major advantage is that the reliability and performance of critical functions, such as provisioning are made more predictable, having the benefit of improved customer satisfaction through fewer missed appointments, more reliable installations, etc. A third important advantage is that customer installation is better facilitated. A fourth valuable advantage is that the current provisioning OSS becomes vastly simpler to design and manage. A fifth advantage is reduction in the cost of initial data collection and storage. A sixth advantage is speed to market, i.e. reduction in time necessary to research and correct inaccuracies in collected data prior to storage.

FIG. 2 is a software flow sheet illustrating how specific Network Access Services are initiated based upon an Autonomous Discovered Object Event, and element and path data. Top-level process diagram for Immediate Network Access Service (INAS) illustrates use of the Object Discovery registration principle to determine next services. Object Discovery results in an autonomous event and may occur when a new NAU, or a replacement or substitute NAU is installed, or as a result of a temporary service outage. The appropriate service depends on whether the discovery is for a previously known (registered) or new (unregistered) object. The Immediate Network Access Service is detailed in FIG. 2. The remaining services are straightforward to understand and entail verifying and reprovisioning the service component in question.

The NAS control flow depicted in FIG. 2 is representative of a logical ordered sequence wherein first consideration is given to new service requests, and second to recovery and restoration.

If a new NAU object is discovered at 239, Object and Path Data are collected and the registration MIB is created at 229. Where the collected data identified is determined at 240 to be unregistered, then Immediate Network Access Service 233 is started. This service can support technician or customer installation, when the object type is recognized, or initiate security services when the object type is unrecognized.

If a discovered NAU was previously registered as determined at 230 and is still at the same network location, it is assumed to have had some service interruption. In this case, the Recovery Service at 234 is performed. Recovery will seek to verify the translations in the network elements of FIG. 1 (HDT 22, Donor LDS 30) are correct, and if not, will correct the translations.

If a previously known NAU is rediscovered, but is now found to be at a different network location, the NAS—Rearrangement service at 241 is initiated. NAU association with a different FN and HDT, or other network element detects at 231 such rearrangement. The customer may have simply moved within the service area of the network. In this case, the Reprovision Switch "from-to" service 238 is run. This move is first treated as legitimate and is used to trigger the HDT Reprovision Move at 237 to restore (or move) the service arrangement of the network. If the move is not legitimate, then the customer would need to terminate or cancel service, which will result in the service disconnect.

FIG. 3 pertains to Immediate Network Access Service, shown at 130, involving Temporary Access, Service Negotiation and Installation service. The access service applies when an unregistered NAU is discovered. The reason for this event occurrence can be either new installation or repair. Depending on whether the discovered object is customer self-installation, or technician installation, as determined at 128, different class access line services, at 127 and 129, are provided automatically. In the event that the Object Discovery relates to data objects, these lines are replaced by non-routable network paths, which in effect, create a hot-line service. Object discovery creates a registration record that is held in the Registration MIB, at 118 or 117, for later use by Provisioning until the appropriate action is determined and the data collected is used to associate the Registration MIB data with the Work Order or with an item being replaced, as explained above.

If the discovered object (NAU) is not a recognizable type, a security alarm is issued at 135.

For a customer performing a self-installation, a hot-line is assigned (or again dynamically provisioned) at 127 to transfer a user to the Business Office. When the customer goes off-hook, at 126, the transfer occurs automatically, typically after receiving a welcome message.

For an installer performing a NAU installation, a similar sequence is initiated. However, upon going off-hook at 121, the hot-line transfers the installer to the provisioning IVR 34 (FIG. 1) to automate the installation or repair activity. The installer enters the work order number and hangs up at 122. The IVR then supplies the collected data to the NAS Application Controller 26 (FIG. 1), which instructs provisioning sequence to perform the required task at 120. Upon completion of the task, the NAS Application Controller, via the IVR, calls the installer's phone to confirm completion at 123, which also provides the benefit of completing an incoming call verification test. The installer, now reconnected to the IVR, signals that the LNP activation is to be completed (if appropriate) and then hangs up at 125. The IVR once again calls the installer, and confirms completion at 136.

Thus, FIG. 3 illustrates the flow for two scenarios for Immediate Network Access Service 130. A new discovered object (unregistered) is first type classified at 128 as either customer installable, technician installable or unknown. Discovered object and path data are then stored in a Registration MIB 117 or 118.

When the system is accessed to perform customer self-installed NAU at 128, upon classification, the NAS service automatically allocates a Business Office hot-line from a pool at 127 and records the temporary TN in the Registration MIB at 118. The service then alerts the phone connected to port 1 of the NAU at 116.

When the call is answered at 126, a welcome message announcement may be played. The caller is instantly transferred to the Business Office via a ring down line, where the desired service can be negotiated with a Customer Service Representative (CSR). The CSR has a display that indicates the NAU type that was discovered. The ring down line is referred to herein as a hot-line. The CSR next enters the order into the Service Management System (SMS 36—FIG. 1) and the Work Order is forwarded to the provisioning OSS 38 (FIG. 1). One function of the SMS will be to record the ANI corresponding to the TN of the hot-line in the Work Order, which is used later by the provisioning system and NAS Application Controller to associate (correlate) the ANI with the Registration MIB data previously recorded. The hot-line TN is of temporary value and serves only the purpose mentioned.

When the system is used to support technician installable NAU, upon classification of installation type, the Network powered NAU 128, requiring a qualified installer, assigns an Integrated Voice Response Unit (IVR) hot-line 129. The service records the TN of the hot-line in the Registration MIB 117. The service signals the phone on port 1 at 121. Answering the call (installer's telephone test set) at 121 results in automatic connection to the IVR which then enables the installer to complete the installation and activation process. The ANI corresponding to the TN of the hot-line is collected by the IVR allows the correlation of IVR data entered by the technician with the provisioning order and Registration MIB to complete the association.

Immediate Network Access Service will also automate subsequent installer activities for testing and LNP transfer, which are automatically sequenced and managed. For example, upon activation, completion is signaled by alerting NAU port 1 at 123. Upon answering, the installer is given a voice message that the local service is active (incoming call completion test), the installer may then signal at 125 that a LNP activation is to occur and hang up. The service will then activate LNP and when confirmed, will again place a call at 136 from the local switch to NAU port I and voice a message to the installer that the LNP activation was successful. Note that the technician only used communications services provided by the network and does not need to use a wireless phone or other alternate communications to implement service.

When the system is used with Restoration and Recovery Services, these services provide a self-healing characteristic to the network and will improve the service, resulting in higher Customer Satisfaction incurring fewer trouble reports and alarms. Reasons for restoration or recovery services include electrical outage, NAU removal/insertion, or a lightning strike, customer actions, installation actions, or repair activities, engineering planned network rearrangements, network failures, etc.

Service restoration is important as network troubles, moves, rearrangements, work being performed, or other disturbances could and sometimes do result in loss of service to customers. If the same service arrangement exists, but for some reason a new discovery occurs for a previously in-service object, recovery is initiated wherein all service elements are verified for correctness.

If the NAU object, being previously in-service, is rediscovered (e.g. possibly resulting from an electrical outage, NAU removal/insertion, or a lightning strike), then the Recovery is initiated. Recovery may or may not require any reprovision of elements, however it is important to first verify and correct element translations in order to ensure that service is being provided. If the NAU object is assigned to the same switch, then a switch translation problem might have caused the service disruption, and the switch provisioning will be verified, utilizing an NASB Verify and Restore Switch.

If the NAU object has been rearranged (i.e. moved to a different HDT, FN, or host switch), reprovision services are used. For example, NAS Reprovision Switch from-to to effect the move of the TN account from the old host switch to the new host switch. Legitimacy assumptions apply.

For IP Telephony using NAS Installation Service scenario, this invention can provide a variation to the Immediate Network Access Services suitable for VoIP services. It requires a modification to the process described above. The process flows described apply, however, the signaling and control specifics differ for IP Services.

Customer self-installation will now be described, because this is the most logical application for a newly discovered IP NAU, called an MTA.

Upon installation of the MTA, a registration request (REQ-REG) is sent to Network Management and Activation System (NMAS) which records the MAC address, assigns non-routable IP address for a hot-line to the Business Office, and downloads temporary Configuration data. This, in effect, implements the Business Office hot-line service. The hot-line TN is stored in the Registration MIB. (At this point the specific customer service association is not yet identified.). The phone on port is next signaled.

The customer answers the phone, receives a welcome message, and is next transferred to the Business Office to order service. Service is negotiated and the SMS sends the Work Order containing the ANI of the hot-line. The customer service representative is provided with data that indicates the type of equipment discovered and the types of services that can be ordered. Upon completion, the customer hangs up the phone.

The order flows to provisioning OSS and a transaction is sent from SMS 36 (FIG. 1) to the controller 26 (FIG. 1) to permit correlation to the Registration MIB.

The OSS 38 interacts with NMAS and provisions CMS (Cable Management System) and assigns routable IP address and downloads correct customer specific configuration file to the MTA.

The MTA line 1 phone is signaled and the customer is sent an IVR voice message confirming that service is active and prompts for customer acknowledgment of service quality. If customer indicates satisfactory service, then the LNP transfer occurs to complete the telephony service. If customer indicates unsatisfactory service, then the customer is automatically transferred to repair.

FIGS. 4 through 11 depict the application of the discovery process as it relates to a "new connect" order over a CATV network. FIG. 4 pertains to an Innate Switch Nomenclature. FIG. 4 depicts static information representing network connectivity between the switch and HDT data that must be entered into the NAS application prior to its use. The nomenclature of switch that is entered is the Switch Identification (e.g. the switch CLLI), Switch Module (SM), Integrated Digital Control Unit (IDCU)/Digital Network Unit of Sonet (DNUS), and the HDT that is connected via normal telecommunications transport facilities. While the terminology being used is germane to a Lucent switch, other switch types and respective information may be substituted. The invention is not limited to any particular switch or switch manufacturer. Each element mentioned above is also associated with its numeric switch translations. A Donor switch is also identified. The Donor is the identification of a switch that will provide the in-band communications channel to gather the IVR data. The donor switch is important, given a complex network technology. Up to five (5) switches might be connected to an HDT. The nomenclature of connecting two or more switches to the same HDT is identified as multi-hosting. In the FIG. 4, data elements are depicted below the network element shown in the center of the figure. Thus, the SM has a value of 001. The first DNUS (value of 1) is assigned, and the HDT whose CLLI is listed has an HDT (a.k.a. RT) number of 20, with an assignable CRV limits ranging from 1 to 100.

FIG. 5 pertains to Nomenclature of the Host Digital Terminal (HDT). FIG. 5 is used to identify the permanent data that must be entered into the NAS controller application prior to use. This data, in part, represents the unique data elements that must be used in HDT commands to range/marshal an NAU and activate a port. The default port to activate is port 1, however, changes to designation in the HDT reference data can alter this.

FIG. 6 pertains to a Generic Example of a Provisioning Work Order. This figure is simply a sample of a subscriber order. Its presence is only used so that the functionality of the NAS application can be described. Master TN (303) 858 3158 represents the first primary TN assigned to an NAU port. LNP indicates that this is a local number portability case. A second TN (303) 858 5160 is a distinctive ring TN that is associated with the Master TN.

FIG. 7 pertains to an Object Discovery message from HDT upon the event that an NAU was powered up on the CATV network. This drawing depicts the information that is provided by the HDT whenever a unit that was not previously provisioned on the HDT is powered up. The information contains the HDT ID, equipment type of the unit being powered up, the equipment's electronic serial number (ESN), and the ID of the modem that was used to pass the message detection through when it was being sent from the NAU to the HDT. This message represents that notification from the HDT to an Element Manager.

FIG. 8 pertains to matching the Object Discovery Message to the Provisioned HDT information. FIG. 8 is presented to show the correlation that occurs between the Object Discovery message (FIG. 6) and the static data that was maintained about the HDT (FIG. 4). Note that the HDT ID is used to correlate two groups of information. It is also important to note that the identification of an available CRV can be found via accessing provisioned information in the HDT. This CRV designation can either be found directly, assuming that the HDT manufacture supports this capability, or can quickly be found via a custom written subroutine that accesses data within the HDT. In any case, a reservation is placed against the CRV that is returned.

The static HDT information also maintains an upper and lower limit for CRV values to be assigned. In the event that a CRV range has been exhausted, an error message will be issued to provisioning personnel that is monitoring the health of the inventory application.

It is also important to note that there can be more that one modem card associated with a FiberNode. Given this situation, the innate and static information referenced in FIG. 4 includes a modem upper limit and the association with companion modem cards is maintained. In the event that an upper limit has been reached and a companion modem card with capacity can be found, then the modem card with the available capacity is used.

Given this information, the HDT now ranges/marshals the NAU and activates port 1.

FIG. 9 pertains to establishing an in-band communication path to enter IVR information. Since the discovered information discussed in FIG. 7 contains the HDT ID, it can be correlated to generic switch information that was discussed in respect to FIG. 4. From the generic switch information, the identification of the donor switch can be found. Additionally, each donor switch has two other information groupings associated with it. The first additional information grouping is a pool of Telephone Numbers (TNs) that are designated in advance for the establishment of the in-band communications channel to gather the IVR information. Note that the status of each TN must be maintained in that it can either be in a state of being in-service or being available for assignment. The second information grouping associated with the donor switch is a generic reference to a Line Class Code (LCC) and RAX code to be used when setting the translations in the switch to instantiate in the in-band communications path. Please note that in this example the term LCC is being used generically to categorize the attributes of a line. At this point, the LEN/OE is dynamically determined via the information identified in conjunction with FIG. 4, the LCC and RAX are known, and the TN from the pool has been given. With these data elements, it is possible to establish the in-band communications path.

After the LEN/OE is derived, it is checked by issuing a verify to the switch directly to ensure that the LEN/OE is not already being used. If the LEN/OE is found to be in use then the line that is using the LEN/OE is disconnected. This action causes no service disruption since the CRV was not previously used to establish a cross-connect in the HDT. The in-band channel is then established.

FIG. 10 pertains to the installer provided IVR information. This Figure depicts the information that is transferred from the installer to the NAS application via an IVR mechanism. The telephone number associated with the temporary hot-line is automatically identified using "Automatic Number Identification" (ANI) also known as "Caller ID" is a common switch generic supported function. The ANI is cross-verified with the hot-line TNs kept in the pool, described in conjunction with FIG. 9. If the TN is found in the pool as "in-service", then the NAS application treats this as a new-connect situation awaiting final provisioning and the application attempts to locate the provisioning work order in the Provisioning OSS and submits the job for completion using the NAU MIB data.

Repair is a service supported by INP-NAS. The installer may replace a faulty unit with a good unit, or attempt to move the service to another port on the existing NAU to restore service. The new unit may be connected to the network, or may replace the existing plug-in unit within the NAU housing. The new replacement NAU is discovered and the service controller creates a Registration MIB for use by the NAS application. The installer selects "replace NAU" from the IVR menu and enters the work order number, and serial number of the faulty NAU to be replaced. The object details of the new NAU are sufficient to allow the NAS application to cause the Provisioning OSS to reprovision the HDT and replace the faulty unit with the new unit.

FIG. 11 pertains to the information used to identify the temporary TN which is to be correlated to the original service order. This Figure depicts how an existing order is associated with the Object Discovery message using information provided in the IVR message. In the case of a new connect order, the temporary ANI (TN) of the hot-line is sent along with the work order number entered by the installer and the association allows all pertinent information concerning the facilities and network resources to be associated with the order.

Assignment of Serving Switch is a consideration. In the event that the hot-line donor switch is also the final host serving switch, a simple set of switch translation changes can be issued to establish the service. In the event that the donor switch is not the final host switch, then a disconnect order is entered to the donor switch of the hot-line service and a new-connect is provisioned on the desired host serving switch and the assignment of a CRV and LEN/OE are re-performed. This action is necessary to ensure that no conflicts exist between the serving switch and the HDT that could result in an errant condition.

Reference is now made to FIG. 12, which depicts events and services as they relate to the state of an object. When the installer is connected to the IVR, the hot-line TN is captured by the IVR using "Automatic Number Identification" (ANI), commonly referred to as "Caller ID." The installer needs only to enter the subscriber's order number and hang up in order to activate service. In the event that the order is for multi-line services, the installer may enter into the IVR information that associates each Master TN with any designated port on the NAU. The master TN is the primary number to be assigned to a line. Sometimes it is not the only line assigned to one port, however, as it is possible for multiple secondary TNs to be assigned with one line. Each line is given a "Distinctive Ring" pattern to help identify the TN being called. The assignment of master TNs to specific ports is at the discretion of the installer. The IVR transaction to the NAS application contains the Originating Telephone Number, Subscriber's Order Number, and—if applicable—the Master TN to NAU port associations.

The ANI is compared with hot-line TNs that are in the pool. If it is found that the originating ANI is a member of the pool and that the status of the TN is "in-service," then the data collected is associated with the registration MIB. In the event that the ANI is not found to be a member of the pool, then the installer will be prompted by the IVR for a Master TN to port assignment and the ESN of the NAU to be used. In this case, the ESN will be used to either find the MIB Registration to complete the service, or reference other NAUs that have already been placed in service. In either case, the associated subscriber order will be used to send appropriate translations to the switch to institute a subscriber's service in accordance to the order that was submitted.

The IVR may also be capable of accepting an independent message from the installer to "move a line assignment" in order to facilitate a repair. The installer can move service from one (faulty) NAU port to another port on the same or another NAU, or support direct replacement of the NAU. In either case. the NAS application will automatically restore service in the re-arranged line in accordance to the service records for the line.

In the event that a change order is submitted, the order is performed on the Due Date and is limited to switch translations that will modify the existing features of an existing line. The line to be changed is found by matching the existing Master TN to that specified on the subscriber's order.

There are several forms of Disconnect orders. A hard-disconnect is defined to be a removal of service that also returns facilities, inventoriable items, and equipment for use by a subsequent new connect order. This implies that all facilities, inventoriable items, and equipment are maintained in service to preserve the circuit to the subscriber's location. Finally, disconnects can be performed in a fashion that the subscriber decides to move their TN to another provider. This is termed as an LNP "port out". In the case, a non-conditional trigger is set in the existing switch and is subsequently removed after so many days that are user determined. Typically, the removal of the trigger happens in 10 days. Lastly, a disconnect or move can be performed with an associated intercept message.

The invention may be embodied in other specific forms without departing from the spirit of the central characteristics thereof. The present embodiments therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of accessing to a network which is obtained more rapidly and has significantly lower human involvement than in the past, comprising the acts of:
   correlating (a) information, communicated to a network access system along a temporary path and automatically registered in a first data storage table within the system, which information identifies a discovered object with (b) data electronically placed in a second data storage table in the system comprising an identifiable order for network services to be provided tote discovered object;
   automatically providing a non-temporary pat based upon correlation of the information in the first table and the data in the second table by which communication services between the object and the network through the system are provided on a compensatory basis.

2. A method according to claim 1 comprising the act of registering the object within the system prior to the correlating act.

3. A method according to claim 2 comprising the act of assigning and registering a number for the discovered object and further comprising the act of removing the object from its discovered location and placing the object at another location, discovering the object at the other location and communicating to and registering information in the network access system along a temporary path which identifies the other location of the object and correlating the new location information with the object information and the order data while automatically preserving the assigned number.

4. A method according to claim 1 comprising the act of registering the object within the system at or near the time of the correlating act.

5. A method according to claim 4 comprising the act of communicating the information from the discovered object across an activated network access unit to the system without triggering an alarm and further comprising the acts of checking within the system to determine if the information was or was not previously registered, and, if not previously registered, to register the same.

6. A method according to claim 1 comprising the act of obtaining the temporary path from an inventory before the correlating act and returning the temporary path to inventory after the automatically providing act.

7. A method according to claim 1 comprising the act of discovering the object pursuant to a technician's services.

8. A method according to claim 1 comprising the act of discovering the object pursuant to a customer's installation.

9. A method according to claim 1 further comprising the act of exchanging the object for another object and automatically communicating and automatically registering identifying information pertaining to theater object and automatically correlating the second object information with the order data.

10. A method according to claim 1 comprising the act of triggering an alarm in lieu of the correlating and automatically providing act when the object is not of a predetermined category of objects.

11. A method according to claim 1 further comprising the act of disconnecting the non-temporary pat to terminate service between the object and the network across the system.

12. A method according to claim 1 comprising the act of including pre-existing network access equipment in the path and automatically assigning the access equipment to the non-temporary path.

13. A method according to claim 12 wherein the including act comprises assigning at least one of a digital loop carrier, a host digital terminal, a switch, a service switching mechanism, intelligent peripheral equipment, service control equipment and voice and/or keyboard response equipment to the path.

14. A method according to claim 1 comprising the step of providing the network access system with a provisioning subsystem and a management subsystem.

15. A method according to claim 1 further comprising the act of joining the object to the network access system at a network access unit which is activated at a switch thereof.

16. A method according to claim 1 comprising the step of providing the system with at least one integrated voice response unit.

17. A method according to claim 1 wherein the correlating act involves information where the object comprises a telephone.

18. A method according to claim 1 comprising the act of including in the system at least one of an element manager subsystem, service management subsystem comprising sequencing and work flow logic, a provisioning operational subsystem establishing account and communications path data, an integrated voice response subsystem.

19. A method according to claim 1 comprising the act of providing a network access system is selected from the group consisting of: dedicated, non-dedicated dial-up and other switched access network systems.

20. A method according to claim 19 comprising the act of providing a network access system which comprises an information service provider or data network.

21. A method according to claim 1 comprising the act of providing one or more of the following services: installation, service negotiation, activation, provisioning, repair, recovery, restoration, rearrangement and disconnect.

22. A method according to claim 1 comprising the act of automatically storing the information and data in a management information database.

23. A method according to claim 1 comprising the act of providing to the system an object state model which enables classification of registered objects, recognized but unregistered objects and unknown unregisterable objects.

24. A method according to claim 1 comprising the act of initiating the method by one of the group consisting of technicians and customers.

25. A method according to claim 1 comprising the act of establishing the discovery event and the temporary path before a customer or technician is contacted on line by an order generating representative.

26. A method according to claim 1 comprising the act of generating the identifying information to comprise number identification and location identification responsive to the discovered event.

27. A method according to claim 1 comprising the act of generating a work order comprising number identification, location identification, customer identification, services requested and path assignment data, all of which is registered in a database.

28. A method according to claim 1 comprising the act of originating an order either before or after assignment of the temporary path.

29. A method according to claim 1 comprising the act of deriving the temporary and non-temporary paths from a pool of available paths stored in memory of the system, requiring no provisioning.

30. A method according to claim 1 comprising the act of defining the temporary and non-temporary paths through the system between the network and an activated switch at or adjacent to the object.

31. A method according to claim 1 comprising the act comprising evaluating the information identifying the object and if determined to be non-registerable, causing an alarm to issue in lieu of the correlating and automatically providing acts.

32. A method according to claim 1 comprising the act of maintaining the non-temporary path for a long term.

33. A method according to claim 1 comprising the act of accessing by a technician to and utilizing an integrated voice response unit by the technician in band path within the system.

34. A method according to claim 1 comprising the act of immediately relying on object discovery information thereby improving accuracy and avoiding collecting and scrubbing of such data.

* * * * *